US011198700B2

(12) United States Patent
Prasad et al.

(10) Patent No.: US 11,198,700 B2
(45) Date of Patent: *Dec. 14, 2021

(54) PROCESS FOR PREPARATION OF O,O DIMETHYL PHOSPHORAMIDOTHIOATE AND N-(METHOXYMETHYLSULFANYL PHOSPHORYL) ACETAMIDE

(71) Applicant: Arysta LifeScience Inc., Cary, NC (US)

(72) Inventors: Vic Prasad, Leawood, KS (US); David Huang, Kunshan (CN); Kamal Kataria, Maharashtra (IN); Christopher Lynn Larson, Cary, NC (US); Cameron Seath Gibb, Apex, NC (US); Stephen Cornes, American Canyon, CA (US)

(73) Assignee: ARYSTA LIFESCIENCE INC, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,182

(22) Filed: Apr. 28, 2020

(65) Prior Publication Data

US 2020/0255459 A1 Aug. 13, 2020

Related U.S. Application Data

(63) Continuation of application No. 16/040,136, filed on Jul. 19, 2018, now Pat. No. 10,669,295.

(51) Int. Cl.
  *C07F 9/24* (2006.01)
  *A01N 57/28* (2006.01)

(52) U.S. Cl.
  CPC ............ *C07F 9/2408* (2013.01); *A01N 57/28* (2013.01)

(58) Field of Classification Search
  CPC .................................................. C07F 9/2408
  See application file for complete search history.

(56) References Cited

U.S. PATENT DOCUMENTS 3,965,218 A 6/1976 Freenor
5,464,600 A 11/1995 Newallis et al.
5,936,113 A 8/1999 Prasad
6,127,566 A 10/2000 Prasad et al.
6,251,350 B1 6/2001 Applegate et al.
10,669,295 B2 * 6/2020 Prasad .................. C07F 9/2487
2020/0024293 A1 1/2020 Prasad et al.

FOREIGN PATENT DOCUMENTS

CN 103288872 A 9/2013
CN 105273003 A 1/2016

OTHER PUBLICATIONS

Hornung et al.; "Schwingungsspektren und Kraftkonstanten der Ubergangsreihen OP9OCH3)3 und SP(SP(OCH3)-SPCI3"; Journal of Inorganic and General Chemistry; 380; pp. 137-145 (1971).
International Search Report and Written Opinion for International Application PCT/US2019/042621; International Filing Date: Jul. 19, 2019; dated Aug. 23, 2019; 5 Pages.
Lebedev et al.; "Alcoholysis of O-Alkyl Phosphorodichloridothioates in Lower Aliphatic Alcohols", J. Gen. Chem. USSR (Engl. Translation); 53(5); pp. 939-942; (1983).
Liaw; "Lessons in Process Safety Management Learned from a Pesticide Plant Wxplosion in Tiawan"; Process Safety Progress; 37(1); pp. 104-109; (2017).
Pistschimuka, "Uber den Methyl- und Athylester der Thiophosphorsaure"; Behm. Ber.; 41; pp. 3854-3859; (1908).

* cited by examiner

*Primary Examiner* — Golam M Shameem
(74) *Attorney, Agent, or Firm* — Cantor Colburn LLP

(57) ABSTRACT

Preparation of O,O-dimethyl phosphoramidothioate and O,O-dimethyl phosphoroamidothioate. A process of making O,O-dimethyl phosphoroamidothioate is described including reacting sulfur with $PCl_3$ to form $PSCl_3$, reacting the $PSCl_3$ formed with methanol to form O-methyl phosphorodichloridothioate, and reacting the O-methyl phosphorodichloridothioate formed with methyl lye to form O,O-dimethyl phosphorochloridothioate in solution in $CH_2Cl_2$, and reacting the O,O-dimethyl phosphorochloridothioate formed with sodium hydroxide and ammonium hydroxide to form O,O-dimethyl phosphoroamidothioate in solution in $CH_2Cl_2$. Reacting the O,O-dimethyl phosphoroamidothioate formed with catalytic dimethyl sulfate to form methamidophos and reacting the methamidophos formed with acetic anhydride to form N-(methoxy-methylsulfanylphosphoryl) acetamide is also described. Throughout the process, the O,O-dimethyl phosphorochloridothioate and the O,O-dimethyl phosphoroamidothioate formed are maintained in solution in $CH_2Cl_2$ at all times.

15 Claims, No Drawings

PROCESS FOR PREPARATION OF O,O DIMETHYL PHOSPHORAMIDOTHIOATE AND N-(METHOXYMETHYLSULFANYL PHOSPHORYL) ACETAMIDE

CROSS-REFERENCE TO RELATED APPLICATIONS

This application is a Continuation of U.S. application Ser. No. 16/040,136 filed on Jul. 19, 2018, which is incorporated herein by reference in its entirety.

TECHNICAL FIELD

The field of art to which this invention generally pertains is insecticidal compositions.

BACKGROUND

Insecticidal compositions, including pesticides, are typically formulated to kill, harm, repel or mitigate one or more species of insect. Insecticides work in different ways. Some insecticides disrupt the nervous system, whereas others may damage their exoskeletons, repel them or control them by some other means. Because of these factors, each insecticide can pose a different level of risk to non-target insects, people, pets and the environment. In addition, the materials used to generate these compositions can present their own handling issues both before, during and after reaction.

Because of the complexity of such insecticidal compositions and the chemicals and reactions associated with their production, there is a constant challenge to generate insecticidal compositions in a safe and effective manner.

BRIEF SUMMARY

A process of making O,O-dimethyl phosphoroamidothioate is described including reacting sulfur with $PCl_3$ to form $PSCl_3$, reacting the $PSCl_3$ formed with methanol to form O-methyl phosphorodichloridothioate, reacting the O-methyl phosphorodichloridothioate formed with methyl lye to form O,O-dimethyl phosphorochloridothioate in solution in $CH_2Cl_2$, and reacting the O,O-dimethyl phosphorochloridothioate formed with sodium hydroxide and ammonium hydroxide to form O,O-dimethyl phosphoroamidothioate in solution in $CH_2Cl_2$, where the O,O-dimethyl phosphorochloridothioate and O,O-dimethyl phosphoramidothioate formed is maintained throughout the process in solution in $CH_2Cl_2$ at all times.

Additional embodiments include: the process described above where the O,O-dimethyl phosphoroamidothioate formed is reacted with catalytic dimethyl sulfate to form methamidophos, and the methamidophos formed is reacted with acetic anhydride to form N-(methoxy-methylsulfanylphosphoryl) acetamide, and wherein the O,O-dimethyl phosphorochloridothioate formed and the O,O-dimethyl phosphoroamidothioate formed are maintained throughout the process in solution in $CH_2Cl_2$ at all times; the method described above run as a batch process; and the method described above run as a continuous process.

These, and additional embodiments, will be apparent from the following descriptions.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

A process for the manufacture of the insecticide acephate (N-(Methoxy-methylsulfanylphosphoryl) acetamide) and its intermediates is described, resulting in enhanced safety over previously utilized methods. The process shown below includes the manufacture of DMPAT (O,O-dimethyl phosphoramidothioate) and subsequently acephate without isolation of intermediates downstream of the mono-ester. Explosions have previously been known to occur when handling its intermediates (e.g., the diester shown below) and DMPAT as neat materials.

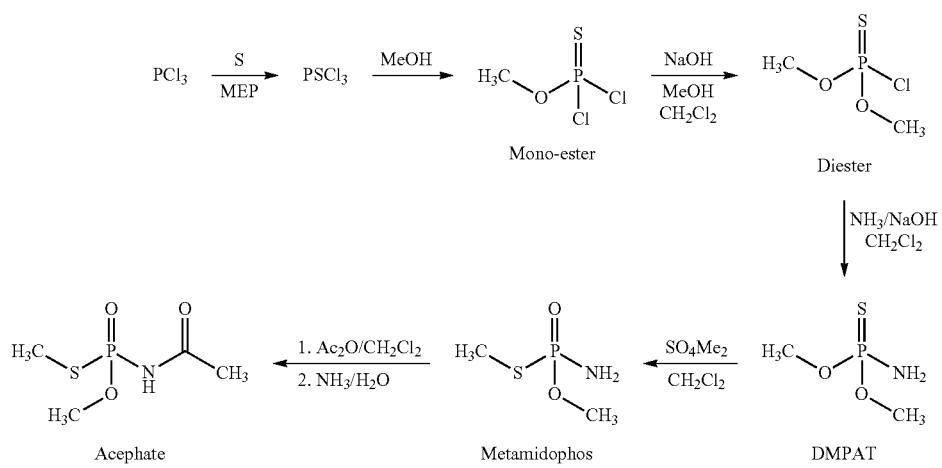

Specifically, the process described herein includes the conversion of PSCl₃ to acephate without isolation of potentially explosive intermediates. Reaction of the mono-ester with MeOH/NaOH (methanol/sodium hydroxide) in a biphasic aqueous/CH$_2$Cl$_2$ system provides the diester as a solution in CH$_2$Cl$_2$, for example, in 85-88% yield and 94-95% purity. The diester is telescoped directly into the reaction with NH$_3$/NaOH to produce the DMPAT, again as a solution in CH$_2$Cl$_2$, e.g., in 98% yield and 93% purity. This DMPAT solution is then converted into methamidophos by reaction with catalytic dimethyl sulfate and subsequently to acephate by treatment with acetic anhydride, all as solutions in CH$_2$Cl$_2$. Acephate is then isolated via neutralization with aqueous ammonia, crystallization and collection by filtration.

As described herein, the DMPAT is typically produced by either batch or continuous processing in four steps as demonstrated below.

The first (PSCl$_3$) step typically involves conversion of phosphorus trichloride to thiophosphoryl chloride by reacting phosphorus trichloride with sulfur in presence of catalyst under inert atmosphere (e.g., nitrogen-argon). The PSCl$_3$ product is distilled and separated as colorless, transparent liquid from the reaction mass; while the residue termed as "HEEL" is recycled back for subsequent batches.

The second (monoester) step typically involves reacting thiophosphoryl chloride in either a continuous or batch mode with methanol to produce O-methyl phosphorodichloridothioate (monoester). By-product HCl is miscible in excess methanol. The reaction mass is washed with water either in batch or continuous mode and aqueous phase and oil phase (monoester) are separated. The monoester may react further at very slow rate to produce the diester which is entrained in the oil phase. The aqueous wash phase is neutralized with caustic solution. It is further treated to isolate and recycle methanol. Remaining aqueous phase containing mostly water is subjected to a conventional multi-effect evaporator to separate water and sodium chloride (for example, for industrial use).

The third (DMPTCl: O,O-dimethyl phosphorochloridothioate) step typically involves using the above monoester oil (crude) as such to react again with methanol in presence of base at accelerated rate to give DMPTCl).

The fourth (DMPAT) step typically involves reacting the diester with aqueous ammonia, liquid ammonia or NaOH/ NH$_4$OH to produce the DMPAT; ammonium chloride is separated from the reaction, e.g., for industrial use.

In greater detail, the first reaction is shown as follows:

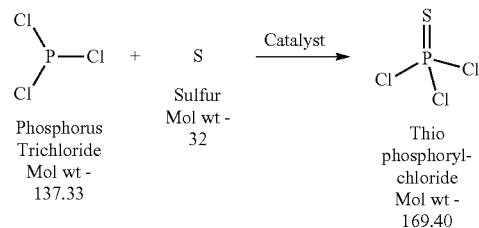

This reaction typically runs very clean, i.e., goes to complete conversion with no specific impurities present in the distilled PSCl$_3$ product at this step.

In the second step, the thiophosphorylchloride is reacted in excess methanol to produce the monoester:

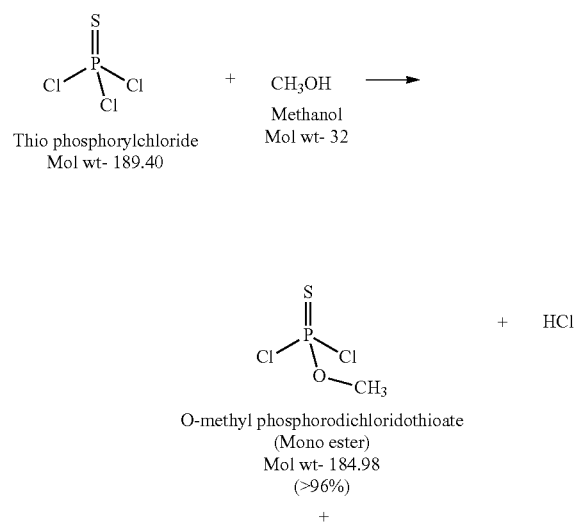

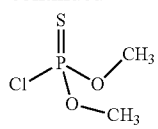

O,O-dimethyl phosphorodichloridothioate
(Diester)
Mol wt- 160.55
(1-2%)

As shown above, in a side reaction the diester is formed in low concentration, being slow to react in the absence of caustic.

In the third step, the monoester reacts at significant rate (e.g., 2 to 3hours) to give the diester (O,O-dimethyl phosphorochloridothioate).

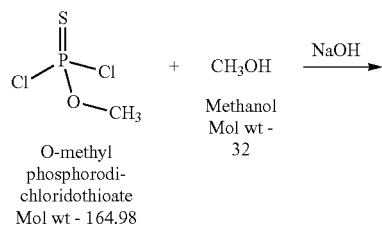

O-methyl phosphorodichloridothioate
Mol wt - 164.98

Methanol
Mol wt - 32

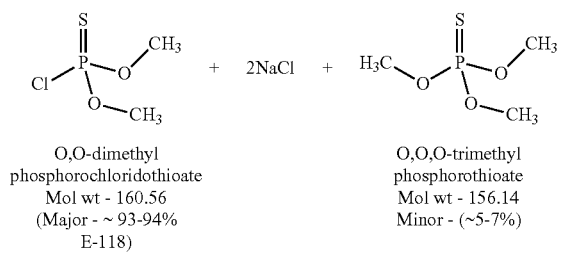

O,O-dimethyl phosphorochloridothioate
Mol wt - 160.56
(Major - ~93-94%
E-118)

O,O,O-trimethyl phosphorothioate
Mol wt - 156.14
Minor - (~5-7%)

As a side reaction a small quantity of triester is also formed during this diester formation.

In the last step shown, the diester is reacted with ammonium hydroxide and sodium hydroxide (e.g., in a continuous mode) to produce the DMPAT (O,O-dimethylphosphoramidothioate). The primary impurity in this step is trimethyl thiophosphate carried over from the previous step. The DMPAT formed may also rearrange to form methamidophos.

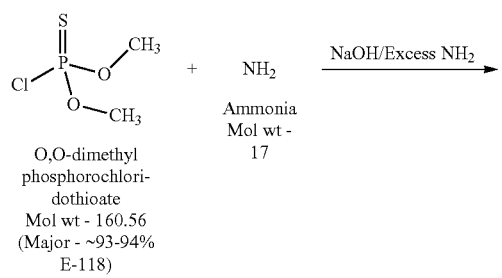

O,O-dimethyl phosphorochloridothioate
Mol wt - 160.56
(Major - ~93-94%
E-118)

Ammonia
Mol wt - 17

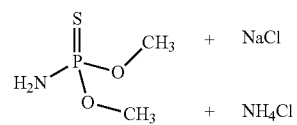

O,O-dimethyl phosphoramidothioate
Mol wt - 141.13

It is important to note that the diester and the DMPAT should be kept in solution at all times. Explosions can occur when these compounds are prepared neat.

EXAMPLE 1

Step 1: Thiolation (Conversion of $PCl_3$ to $PSCl_3$)

In a multipurpose glass lined reactor of suitable size, molten sulfur (120° C.) is charged (see Table 1) under nitrogen blanket (For the $1^{st}$ batch (Recycle-0), Sulfur is charged 40% excess with respect to $PCl_3$ to ensure proper conversion and reflux temperature). From the metering tank, phosphorus trichloride is added under working condensers and reflux valves open to ensure reflux back of vaporized $PCl_3$. The required quantity (see Table 1) of MEP (methyl ethyl pyridine) is added to the above reaction mixture and the reaction mass is started to be heated. (MEP Catalyst is added only for $1^{st}$ and $2^{nd}$ batches, while in subsequent batches it gets carried/recycles via the "HEEL"). Agitator and jacket heating (via high pressure steam) of the reactor is started. The temperature of the reaction mass is raised from initial reflux of 80° C. to 130° C. from 1 to 2 hours. The reaction mass is cooked at 130° C. for another 2 to 3 hours maintaining a nitrogen blanket throughout (Under air or the presence of oxygen, may lead to formation of $POCl_3$ impurity). The reaction mass is checked for $PSCl_3$; $PCl_3$ content (end of reaction: $PCl_3$ is less than 0.5%). Once the reaction is completed, the reaction mass is cooled down to 40° C. before distillation. Distillation of the $PSCl_3$ is started under vacuum (700-710 mm (millimeters) Hg absolute; Temperature 40° C. to 70° C. (reactor temperature) and distilled clear water-like material is collected into a glass distillate receiver. Distillate is collected at about 70% to about 75% based on the reaction mass volume. The residue at the bottoms (HEEL) is cooled down and recycled for a subsequent batch (see Table 1). Subsequent conversions are continued and after about 8 to about 10 recycles, % molar yield in-hand of $PSCl_3$ with regard to $PCl_3$ reaches 98% (After 3 to 4 recycles, distillate exceeds 100%; after about 9 to about 10 recycles in-hand molar yield of $PSCl_3$ with regard to $PCl_3$ reaches 98%).

TABLE 1

Representative Process Parameters

| Parameter | Charge Ratio (K moles) | | | Cook Temp, ° C. | Distillate recovered, % |
| --- | --- | --- | --- | --- | --- |
| | Sulfur | $PCl_3$ | MEP (catalyst) | | |
| Recycle-0 | 1.4 | 1.0 | 0.008 | 120-135 | 70-75 |
| Recycle-1 | 1.0 | 1.0 | 0.008 | 120-135 | 75-80 |
| Recycle-2 | 1.0 | 1.0 | 0 | 120-135 | 80 |
| Recycle-3 | 1.0 | 1.0 | 0 | 120-135 | 85 |
| Recycle-4 | 1.0 | 1.0 | 0 | 120-135 | 90 |

TABLE 1-continued

Representative Process Parameters

| Parameter | Charge Ratio (K moles) | | | Cook Temp, ° C. | Distillate recovered, % |
|---|---|---|---|---|---|
| | Sulfur | PCl$_3$ | MEP (catalyst) | | |
| Recycle-5 | 1.0 | 1.0 | 0 | 120-135 | 100 |
| Recycle-6 (See Note-4) | 1.0 | 1.0 | 0 | 120-135 | 110 |

EXAMPLE 2

Step 2: O-methyl Phosphorodichloridothioate (Methanolysis of PSCl$_3$)

In a glass lined reactor of suitable size with external heat exchanger & circulatory pump, pre-cooled Thiophosphoryl chloride (PSCl$_3$ 99.5% pure) is charged 40% of the total batch requirement & maintained at the same temperature in the reactor. The bottom valve of the reactor is switched on and PSCl$_3$ is looped back to the reactor via an external heat exchanger. Once the circulation is stabilized, pre-cooled methanol (4 molar ratio; 0-5° C.) is added into a circulatory pump inlet line at the rate so as to complete its addition in 3 hours. The remaining quantity of PSCl3 (60%, 0-5° C.) is also added in parallel to methanol, however, it is added via a top liquid addition port into the reactor. Post completion of addition, reaction mass is maintained at 0-10° C. under agitation for another 2 to 3 hours. Reaction mass is analyzed for completion of reaction (PSCl3 less than 0.5%; Mono-ester greater than 95%; Diester 2-3%; Triester less than 1%). Reaction mass is then transferred to a wash reactor & Water is added into it at 0-10° C. and agitated for another 1 to 2 hours. The phases are separated to provide the mono-ester which is carried forward without additional processing.

EXAMPLE 3

Step 3: O,O-dimethyl Phosphorochloridothioate (Diester E-118 formation)

O-Methyl Phosphorodichloridothioate is charged to a reactor and diluted with CH$_2$Cl$_2$ (3 liters per kilogram (L/kg)). The batch is stirred, and the temperature is adjusted to −5 to 5° C. "Methyl lye" (1.1 equivalent) is added to the batch over 2-3 hours maintaining the temperature at −5 to 5° C. "Methyl lye" is prepared by reaction of pre-chilled (0-5° C.) methanol (1.1 equivalent) with aqueous sodium hydroxide (1.1 equivalent) under an inert atmosphere. Commercial "methyl lye" may also be used. Stirring is continued at −5 to 5° C. for 1 hour then analyzed for reaction completion by gas chromatography (GC). The reaction is deemed complete when the relative mono-ester concentration is less than 0.5%. Stirring is stopped and the phases are separated. O,O-dimethyl Phosphorochloridothioate (E-118, Diester) is isolated as a solution in CH$_2$Cl$_2$ in 85% to 88% yield and 94% to 95% purity (GC analysis). E-118 must be maintained in solution at all times.

EXAMPLE 4

Step 4: DMPAT (Ammonolysis)

To a continuously stirring reactor system (CSTR) maintained at 40° C. is simultaneously added a DCM (dichloromethane) O,O-Dimethyl phosphorochloridothioate (E-118), 25% sodium hydroxide maintained at 0.93 molar equivalents with respect to E-118, 18% ammonium hydroxide maintained at 1.41 molar equivalents with respect to E-118. The residence time of the reaction is 3 hours at 40° C. The reaction mixture is continuously removed to maintain the desired volume. The phases are separated, and the aqueous phase is extracted with CH$_2$Cl$_2$ to recover O,O-dimethyl phosphoroamidothioate (DMPAT). The organic extracts are combined to give DMPAT as a solution in CH$_2$Cl$_2$ which may be used without further purification. DMPAT is isolated in 98% yield and about 93% purity containing about 7% trimethylthiophosphate. This product must be maintained in solution at all times.

TABLE 2

Representative Impurity Profile

| Anticipated Impurities | Structure | Source |
|---|---|---|
| Trimethyl thiophosphate (triester) | (structure with P=S, three OMe groups) | Over reaction in Step 3 |
| Methamidophos | (structure with P=O, H$_2$N, S-Me, O-Me) | Rearrangement of DMPAT |
| O,O,S-Trimethyl phosphorothioate | (structure with P=O, two O-Me, S-Me) | Rearrangement of triester |

As used herein, the term "about" refers to a measurable value such as a parameter, an amount, a temporal duration, and the like and is meant to include variations of +/−15% or less, preferably variations of +1-10% or less, more preferably variations of +/−5% or less, even more preferably variations of +/−1% or less, and still more preferably variations of +1-0.1% or less of and from the particularly recited value, in so far as such variations are appropriate to perform in the invention described herein. Furthermore, it is also to be understood that the value to which the modifier "about" refers is itself specifically disclosed herein.

These examples are merely illustrations and are not to be understood as limiting the scope and underlying principles of the invention in any way. Various modifications of the invention in addition to those shown and described herein will become apparent to those skilled in the art form after the following examples and foregoing description. Such modifications are also intended to fall within the scope of the appended claims.

As described herein, these problems and others in this area are addressed by the invention described herein. Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process of making O,O-dimethyl phosphoroamidothioate comprising,
reacting O-methyl phosphorodichloridothioate with methyl lye to form O,O-dimethyl phosphorochloridothioate in solution in $CH_2Cl_2$, and
reacting the O,O-dimethyl phosphorochloridothioate formed with aqueous ammonia, liquid ammonia, or sodium hydroxide and ammonium hydroxide to form O,O-dimethyl phosphoroamidothioate in solution in $CH_2Cl_2$,
wherein the O,O-dimethyl phosphorochloridothioate and O,O-dimethyl phosphoramidothioate formed is maintained throughout the process in solution in $CH_2Cl_2$ at all times.

2. The process of claim 1, further comprising reacting $PSCl_3$ with methanol to form the O-methyl phosphorodichloridothioate.

3. The process of claim 2, further comprising reacting sulfur with $PCl_3$ to form the $PSCl_3$.

4. The process of claim 1, further comprising reacting the O,O-dimethyl phosphoroamidothioate formed with catalytic dimethyl sulfate to form methamidophos.

5. The process of claim 4, further comprising reacting the methamidophos formed with acetic anhydride to form N-(methoxy-methylsulfanylphosphoryl) acetamide.

6. The process of claim 2, further comprising reacting the O,O-dimethyl phosphoroamidothioate formed with catalytic dimethyl sulfate to form methamidophos.

7. The process of claim 6, further comprising reacting the methamidophos formed with acetic anhydride to form N-(methoxy-methylsulfanylphosphoryl) acetamide.

8. The process of claim 3, further comprising reacting the O,O-dimethyl phosphoroamidothioate formed with catalytic dimethyl sulfate to form methamidophos.

9. The process of claim 8, further comprising reacting the methamidophos formed with acetic anhydride to form N-(methoxy-methylsulfanylphosphoryl) acetamide.

10. The process of claim 4, run as a batch process or a continuous process.

11. The process of claim 5, run as a batch process or a continuous process.

12. The process of claim 6, run as a batch process or a continuous process.

13. The process of claim 7, run as a batch process or a continuous process.

14. The process of claim 8, run as a batch process or a continuous process.

15. The process of claim 9, run as a batch process or a continuous process.

* * * * *